Oct. 22, 1935.  J. D. MORGAN ET AL  2,018,219
COIL SPRING TESTER
Filed March 24, 1933
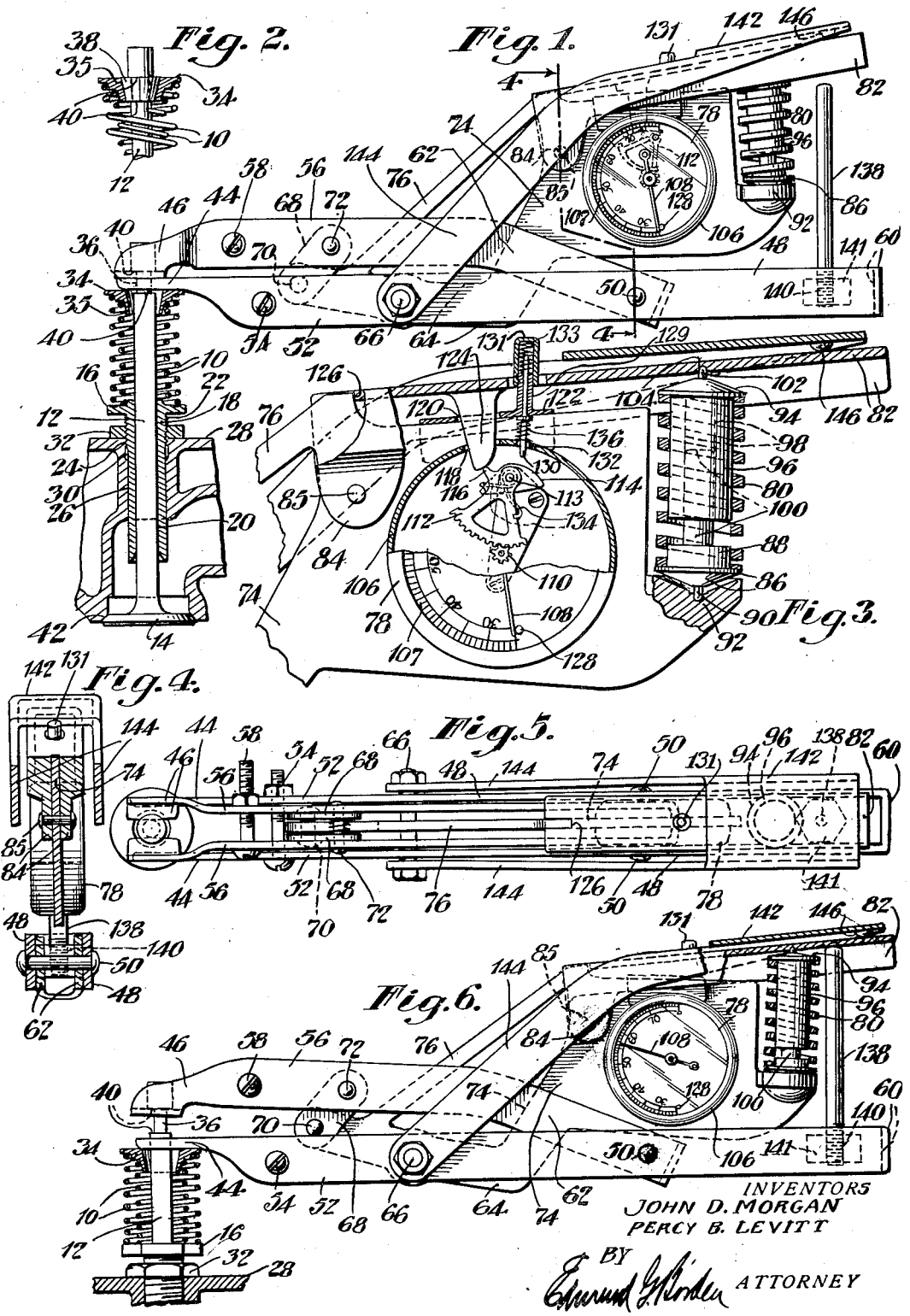
INVENTORS
JOHN D. MORGAN
PERCY B. LEVITT
BY
Edmund G. Borden
ATTORNEY Patented Oct. 22, 1935

2,018,219

UNITED STATES PATENT OFFICE 2,018,219

COIL SPRING TESTER

John D. Morgan, South Orange, N. J., and Percy B. Levitt, Jackson Heights, N. Y., assignors to Doherty Research Company, New York, N. Y., a corporation of Delaware Application March 24, 1933, Serial No. 662,426

5 Claims. (Cl. 265—19)

This invention relates to a device for testing the deflection resistance strength of poppet valve springs and the like.

As is well known the valves controlling the fuel charging and exhaust ports of most automotive engine cylinders are of the poppet valve type. Usually these valves are held to their seats by coil springs mounted in operative relation to the valve stem so as to resist the opening of the valve by the actuating cam shaft. For the satisfactory operation of automotive engines equipped with poppet valves and valve springs mounted to resist the opening of said valves, it is essential that the valve springs function perfectly; as otherwise there is loss of power by leakage past the valves. Normally such valve springs are subjected to rigid tests for tension and torsional strength before being mounted on the engine. However, owing to the severe service which such valve springs undergo, weaknesses are apt to develop therein through over-strain which necessitate periodic inspection and adjustment or replacement of the springs if the valves are to continue to operate satisfactorily. Heretofore it has been the practice to remove the valve springs from their mountings on the valve stems in order to recheck their strength and deflection characteristics. This practice is both inconvenient and unsatisfactory in that stresses resulting from service mounting factors such as poor alignment and friction are not adequately considered and measured.

The primary object of the present invention is to provide a device suitable for testing the deflection resistance strength of poppet valve springs and the like, without removal of the springs from their normal service position.

With this and other objects and features in view which will hereinafter appear, the invention consists in the improved coil spring deflectometer adapted for testing springs in service position, as hereinafter described and particularly defined in the accompanying claims.

In the following explanation of the invention, reference will be made to the illustrative drawing, in which:

Fig. 1 is a view in side elevation of a preferred embodiment of the coil spring testing device, illustrating its application for testing a multi-coil poppet valve spring;

Fig. 2 is a view in vertical section illustrating a standard method of locking the valve spring of Fig. 1 to the valve stem;

Fig. 3 is an enlarged view in side elevation, with parts broken away and parts in section, showing the indicating gauge elements of the testing device illustrated in Fig. 1;

Fig. 4 is an end view in vertical section of the testing device, taken on the line 4—4 of Fig. 1;

Fig. 5 is a top plan view of the testing device illustrated in Fig. 1; and

Fig. 6 is a view in side elevation showing the relative position of the parts of the device when applying a full deflection load to a poppet valve spring.

Referring to the accompanying drawing, which illustrates an application of the invention to the testing, in service position, of the coil seating spring of an automotive poppet valve, it will be seen that the spring 10 which is to be tested is illustrated as a multi-coil spring which is mounted coaxially with the stem 12 of a poppet valve 14. The lower end of each coil of the spring is seated on the head 16 of an externally threaded bushing 18. Bushing 18 has a central bore 20 within which stem 12 is reciprocably journaled. The external threads 22 on bushing 18 engage internal threads 24 in the upper walls of a valve stem sleeve aperture 26 in the engine cylinder head 28. The lower portion of bushing 18 is held in tight sleeve engagement with the walls of aperture 26, but an enlargement 30 at the upper end of the aperture allows for vertical adjustment of the position of the bushing in the aperture. A lock nut 32 is provided having internal threads which mesh with the external thread of the bushing 18.

On the upper end of spring 10 is mounted a cap washer 34 having an inverted frusto-conical bore 35. An annular groove 36 is cut in valve stem 12 at a definitely spaced distance from the valve head, and according to common practice a split washer 38 (Fig. 2) is provided having a central bore which fits the grooved portion 36 of the valve stem. The split washer 38 is mounted on the valve stem between the shoulders 40 of groove 36, and has an inverted frusto-conical periphery conforming in contour and dimensions with the bore 35 of spring cap 34. With the spring 10 properly mounted, cap 34 serves to hold the halves of washer 38 in place in groove 36, and at the same time washer 38 locks spring cap 34 to the valve stem so that the full tension strength of the spring resists movement of valve 14 away from its seat 42.

Considering now the spring deflectometer which is illustrated in the drawing, it will be seen that this includes a pair of bifurcated expanding plier jaws 44 and 46. The lower jaw 44 of the illustrated device has a lever handle extension or shank 48 which forms the base on which the shank of upper jaw 46 is pivotally mounted by the pin 50. As stated, each of jaws 44 and 46 is bifurcated; i. e. in the illustrated device (Fig. 5) the lower jaw and its shank comprise two uniformly dimensioned horizontally spaced metal plates or straps 52 which are just sufficiently flexible so that the space separating them may be adjusted by the bolt and nut 54; and similarly the upper jaw 46 and its shank comprise two uniformly dimensioned horizontally spaced metal straps 56, the horizontal spacing of which is adjustable by the bolt and nut 58. In the device illustrated the straps 52 comprising the lower jaw 44 and its shank are connected at the handle end 48 of the shank by an integral elbow strap 60. The straps 56 comprising the upper jaw and its shank are likewise integral and are bent downwardly at a point adjacent the pivot pin 50 to form an elbow 62. This construction insures a substantially rectilinear motion of the jaws 44 and 46 as they are spread apart.

While the straps 52 and 56 are pivotally connected by the pin 50, other means are provided for use in cooperation with the handle 48 of the lower jaw in applying the necessary pressure for forcing the jaws 44 and 46 apart when they are engaged respectively with the spring 10 and valve-stem 12. The means referred to comprises essentially a rocker arm 64 pivotally mounted on the shank 48 of the lower jaw by a pin 66. That end of rocker arm 64 which is nearest jaw 44 is pivotally connected to each of straps 56 comprising the shank of jaw 46 by a pair of strap links 68. Links 68 are pivotally connected to the rocker arm and to the shank of jaw 46 respectively by pins 70 and 72. The other free end of rocker arm 64 is provided with an integral clamp lever extension 74. Numeral 76 designates a stiffening strap forming an integral connection between lever 74 and that end of rocker arm 64 on which links 68 are pivoted.

It will be understood that with the parts of the device so far described, the jaws 44 and 46 may be spread or forced apart by application of squeezing pressure to the levers 48 and 74 in a direction forcing the levers toward each other.

The device embodies mechanism for measuring the pressure required to spread the jaws 44 and 46. As illustrated, this mechanism includes an indicating gauge 78, a calibrated comparator spring 80, and a power transmission lever 82, all of which are mounted on lever 74. Transmission lever 82 has depending ears 84 at one end thereof which straddle lever 74 and which are pivotally mounted thereon by a pin 85. The illustrated lower end of spring 80 (Fig. 3) is mounted on the head 86 of a coaxial stud 88, and the head 86 is in turn provided with a coaxial extension pin 90 which is journaled in a thrust bearing 92 in the lever 74. The upper end of spring 80 is capped by head 94 of a coaxial sleeve stud 96, sleeve 96 having a central bore 98 in which a plunger extension 100 of stud 88 is reciprocably journaled. A coaxial extension pin 102 on sleeve head 94 is journaled in a thrust bearing 104 in the unpivoted end of transmission lever 82.

Indicating gauge 78 comprises a casing 106 mounted on lever 74 within which is placed a dial having a scale 107 graduated in pounds deflection resistance strength of spring 80. A needle 108 is keyed centrally of the casing to the rocker shaft of a small toothed pinion wheel 110. A segment of a gear wheel 112 is journaled on a pin shaft 113 with its teeth in meshing relation with the teeth of pinion 110. A cam 114 is keyed to the shaft 113 and a wire spring 134 flexibly links cam 114 with gear 112. A shoulder 116 is formed on the hub of gear 112 in vertical alignment below apertures 118 and 120 formed respectively in casing 106 and in a flange 122 at the upper edge of lever 74. An extension 124 depends from transmission lever 82 in position to engage part 116 of wheel 112 to rotate wheel 112 counterclockwise and needle 108 clockwise over the scale, whenever lever 82 is pressed downwardly toward the upper edge of lever 74.

Spring 80 in no load position holds the end of transmission lever 82 to which it is attached in spaced relation above the upper edge of lever 74. A shoulder 126 on the part of lever 74 which is straddled by the pivoted end of transmission lever 82 serves as a stop to prevent any counter clockwise rotation of the transmission lever beyond the position where extension 124 breaks contact with part 116 of wheel 112. A stop pin 128 is provided for the indicating needle 108 at the zero position of the gauge scale. The zero position of the gauge scale represents the number of pounds load required to cause measurable deflection of the spring 80; i. e. 25 pounds in the illustrated embodiment. A reset pin 130 is mounted on the top edge of lever 74 over an aperture 132 in the gauge casing, and by pressing this pin downwardly into contact with cam 114 the needle 108 can be returned to the zero position on the gauge scale whenever extension 124 breaks contact with part 116 of wheel 112. Pin 130 is journaled in an axial aperture of a cylindrical shoulder 129 on flange 122, and a press button 131 is journaled on shoulder 129 and attached thereto by a coil spring 133, which spring acts to normally hold button 131 out of engagement with pin 130, except when pressure is applied thereto to depress the pin. Spring 134 assists this action by a mounting whereby it resists counter-clockwise rotation of wheel 112. Another small coil spring 136 is mounted in position to normally hold pin 130 in disengaging relation to cam 114, as illustrated.

The distance through which jaws 44 and 46 may be spread by squeezing levers 48 and 74 is made adjustable by means of a stop pin 138 having a threaded portion 140 threadably engaging a nut 141 the periphery of which is welded on or otherwise permanently attached to both side straps 52 of handle 48. To insure application of pressure to the spreading device at a substantially constant distance from the pin 66, a bifurcated grip handle 142 is mounted astraddle lever 74 and transmission lever 82, with its legs 144 pivoted on pin 66. On the lower side of the free end of this grip handle there is an integral small depending knob 146 by which all force applied to the handle is transmitted downwardly to the free end of transmission lever 82. It will be understood that the spring 80 resists movement of the grip handle 142 and lever 82 toward the lever handle 48 as well as toward the top of lever 74. To check the calibration of spring 80 and scale 107, the stop pin 138 may be removed to allow for a gauge reading corresponding to the load strength of the spring 80 in resisting deflection by the forcing of the transmission lever 82 into contact with the top of lever 74. This test is made with the jaws 44 and 46 free to spread as far as permitted by the arc through which lever 74 has to move before coming in contact with pin 50 or lever 48 using a comparator spring 80 having a strength for example of 100 pounds gauge per half inch deflection for resisting without permanent distortion the full throw arc of the lever 82. The stop pin 138 is then reinserted and its height adjusted so as to prevent member 74 from striking pin 50 or lever 48 during normal operation of the device. The spread of the jaws 44 and 46 should correspond substantially with the throw of the valve 14, or in other words with the maximum deflection to which the spring 10 under test is subjected under service conditions.

To test the deflection resistance strength of the valve spring 10, pressure is applied to the cap 34 to break the lock between the spring and the valve stem, and the halves of split lock washer 38 are removed. Jaws 44 and 46 of the valve spreader are inserted (Fig. 1) in the place formerly occupied by the washer 38, and the spacing of the bifurcated ends of straps 52 comprising the lower jaw 44 is adjusted to straddle the valve stem below groove 36 and rest on spring cap 34; while the ends of straps 56 comprising spreader jaw 46 are likewise adjustably spaced to straddle the groove portion 36 of stem 12 while engaging the upper shoulder 40 of groove 36. The tension of the spring 80 will lock the spreader jaws in closed relation with the jaws proportioned as shown so that their combined thickness substantially corresponds with the length of groove 36 and washers 38. With the stop pin 138 of the spring spreader in its zero gauge reading position last discussed, squeezing pressure is applied to the handles 48 and 142 sufficient to spread the jaws 44 and 46 a distance corresponding to the operating throw of valve 14. Jaw 46 serves as a fulcrum to hold the valve seated while jaw 44 deflects spring 10. With the spreader jaws 44 and 46 in closed relation (Fig. 1) the transmission lever 82 is out of contact with stop pin 138 and the spreading of the jaws forces needle 108 to swing to a position on the gauge scale indicating the pressure required to overcome the resistance offered by spring 80 in bringing transmission lever 82 again into contact with pin 138. The pressure thus indicated represents the strength of spring 10 resisting full opening of valve 14, and for the ordinary automotive engine this reading normally corresponds to about 55 pounds gauge. If the reading of the gauge is substantially below or above that representing the correct compressive strength which the spring 10 should have the spring may either be replaced or its compressive strength adjusted by a corresponding adjustment of its length by means of the bushing 18 and lock nut 32.

While in the foregoing description the valve spring tester forming the subject of the invention has been described as manually operative, and with reference to a specific application for testing light poppet valve springs; it will be readily understood that the invention is not so limited, but contemplates a mechanically powered unit and application to the testing of other types and arrangements of coil springs while mounted in normal service position.

The invention having been thus described, what is claimed as new is:

1. In a spring deflectometer, expanding pliers comprising a pair of bifurcated jaws with shanks pivotally connected, one of said jaw shanks having a lever handle extension, a rocker arm pivotally mounted on the shank of one of the jaws and having an actuating lever extension, a link connecting said rocker arm with the shank of the other jaw, a power transmission lever pivotally mounted on said actuating lever extension of said rocker arm, a deflection gauge having an indicating needle and actuating mechanism therefor mounted in position for deflection by said transmission lever, and a calibrated coil spring mounted in position to resist movement of the unpivoted end of the transmission lever in a direction tending to deflect the indicating needle on application of pressure to the transmission lever in a direction tending to force said jaws apart.

2. In a spring deflectometer, expanding pliers comprising a pair of bifurcated jaws with pivotally connected shanks, one of said jaws having a lever extension comprising one grip handle of the pliers, a rocker arm pivotally mounted on the shank of one of the jaws and having an actuating lever extension, a link connecting said rocker arm with the shank of the other jaw, a power transmission lever pivotally mounted on said actuating lever, a deflection gauge having an indicating needle and actuating mechanism therefor mounted in position for deflection by said transmission lever, a calibrated coil spring mounted in position to resist movement of the unpivoted end of the transmission lever in a direction tending to deflect the indicating needle on said gauge, and a stop member for adjustably limiting movement of the unpivoted end of the transmission lever.

3. In a spring deflectometer, expanding pliers comprising a pair of bifurcated jaws having shanks pivotally connected, one of such jaws having a lever handle extension, a rocker arm mounted on the shank of one of said jaws and having an actuating lever extension, a link connecting said rocker arm with the shank of the other jaw, a power transmission lever pivotally mounted on said actuating lever extension, a deflection gauge having an indicating needle and actuating mechanism therefor mounted in position for deflection by said transmission lever, a calibrated coil spring mounted in position to resist movement of the unpivoted end of the transmission lever toward the lever handle on application of squeezing pressure to the transmission lever and lever handle, and a grip lever pivotally mounted on one of said jaw shanks and having a knob adapted to supply pressure to the transmission lever at a substantially constant distance from the pivotal mounting of the grip lever.

4. In a spring deflectometer adapted to test the deflection resistance strength of a coil spring in its service mounting, the combination of a pair of expanding pliers having jaws with shanks, one of said shanks having a lever handle extension, a rocker arm pivotally mounted on one of said shanks and having an actuating lever extension, a link connecting said rocker arm with the other jaw shank, means for measuring the pressure required to force said jaws apart against the resistance of the spring under test, said means including a calibrated spring mounted on one of the said lever extensions in position to resist separation of the jaws, and a deflection gauge operatively connected with said calibrated spring whereby to measure the deflection thereof resulting from separation of the jaws.

5. In a spring deflectometer, expanding pliers comprising a pair of jaws with shanks, a lever extension for one of said shanks, a rocker arm pivotally mounted on one of said shanks and having an actuating lever extension, a link connecting said rocker arm with the other jaw shank, a power transmission lever pivotally mounted on one of said lever extensions, a deflection gauge having an indicating needle and actuating mechanism therefor mounted in position for deflection by said transmission lever, and a calibrated coil spring mounted in position to resist movement of the unpivoted end of the transmission lever in a direction tending to deflect said indicated needle on application of pressure to the transmission lever and lever extensions in a direction tending to force said jaws apart.

JOHN D. MORGAN.
PERCY B. LEVITT.